United States Patent [19]

Nilsson

[11] Patent Number: 5,474,328
[45] Date of Patent: Dec. 12, 1995

[54] STORED GAS HYBRID DRIVER INFLATOR

[75] Inventor: Karl E. Nilsson, Ottobrunn, Germany

[73] Assignee: Morton International, Inc., Chicago, Ill.

[21] Appl. No.: 215,832

[22] Filed: Mar. 22, 1994

[30] Foreign Application Priority Data

Apr. 6, 1993 [DE] Germany .................. 43 11 276.5

[51] Int. Cl.$^6$ .................................................. B60R 21/26
[52] U.S. Cl. ........................................................ 280/737
[58] Field of Search ................................. 280/737, 736, 280/741, 742; 220/89.2, 89.3; 222/3, 5; 137/68.1, 68.2

[56] References Cited

U.S. PATENT DOCUMENTS

| | | | |
|---|---|---|---|
| 3,901,530 | 8/1975 | Radke | 280/741 |
| 3,966,226 | 6/1976 | Roth | 280/737 |
| 4,203,616 | 5/1980 | Okada | 280/737 |
| 4,275,901 | 6/1981 | Okada | 280/737 |
| 4,289,327 | 9/1981 | Okada | 280/737 |
| 5,263,740 | 11/1993 | Frey et al. | 280/737 |
| 5,273,312 | 12/1993 | Coultas et al. | 280/737 |
| 5,362,099 | 11/1994 | Föhl | 222/5 |

FOREIGN PATENT DOCUMENTS

| | | | |
|---|---|---|---|
| 0455435 | 11/1991 | European Pat. Off. . | |
| 0559335 | 9/1993 | European Pat. Off. . | |
| 2443267 | 3/1975 | Germany | 280/741 |
| 3126079 | 4/1982 | Germany . | |

*Primary Examiner*—Margaret A. Focarino
*Assistant Examiner*—Paul N. Dickson
*Attorney, Agent, or Firm*—Nick C. Kottis; Gerald K. White

[57] ABSTRACT

A gas generator apparatus for an air bag is provided and includes a pressure container for receiving a high pressure, highly compressed gas. The container includes an opening closed by a seal. While the seal, by itself, would not withstand the pressure in the gas-filled container, the apparatus also includes a supporting element, which supports the side of the seal opposite the opening. The supporting element is displaceable by action of a release mechanism to effect release of gas from the container.

19 Claims, 4 Drawing Sheets

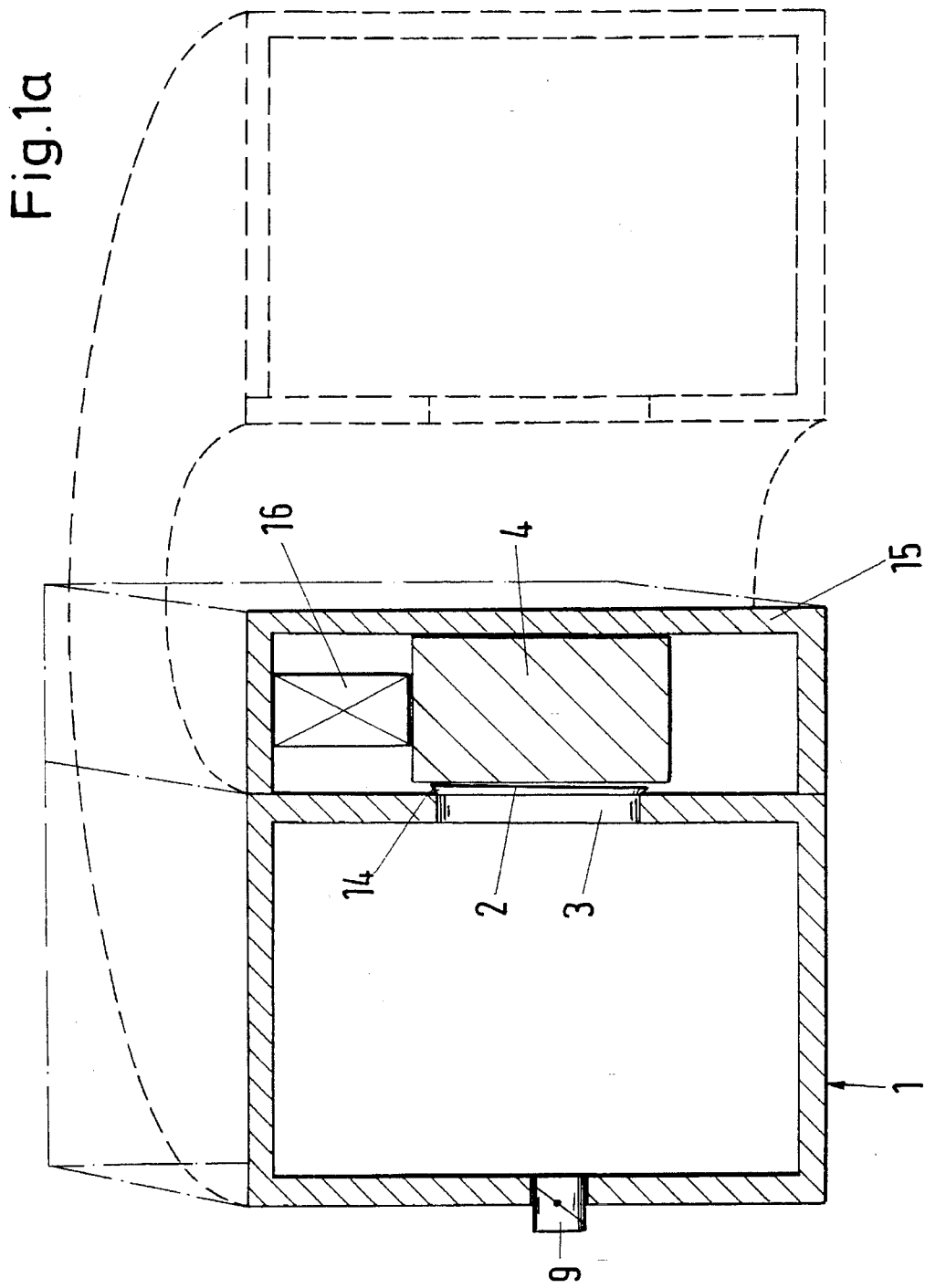

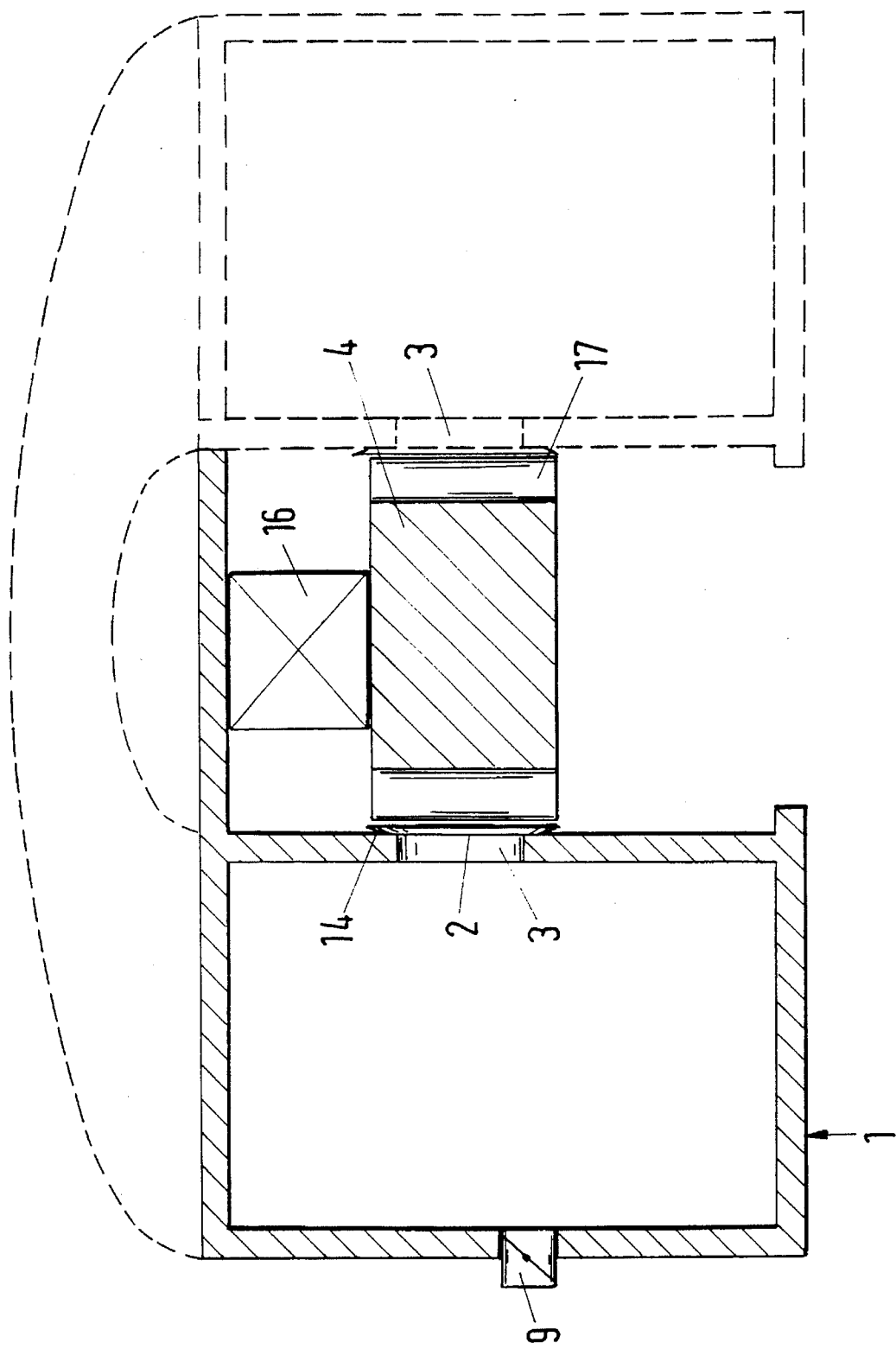

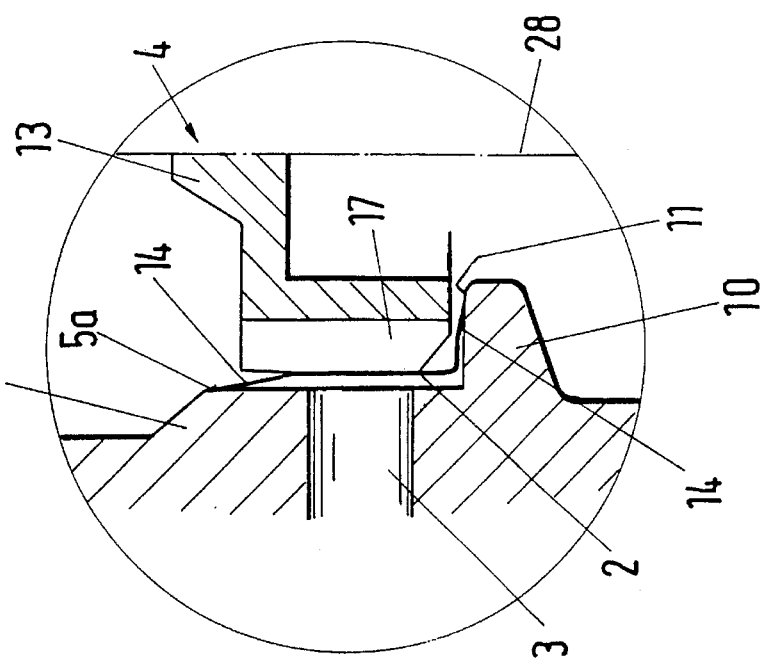
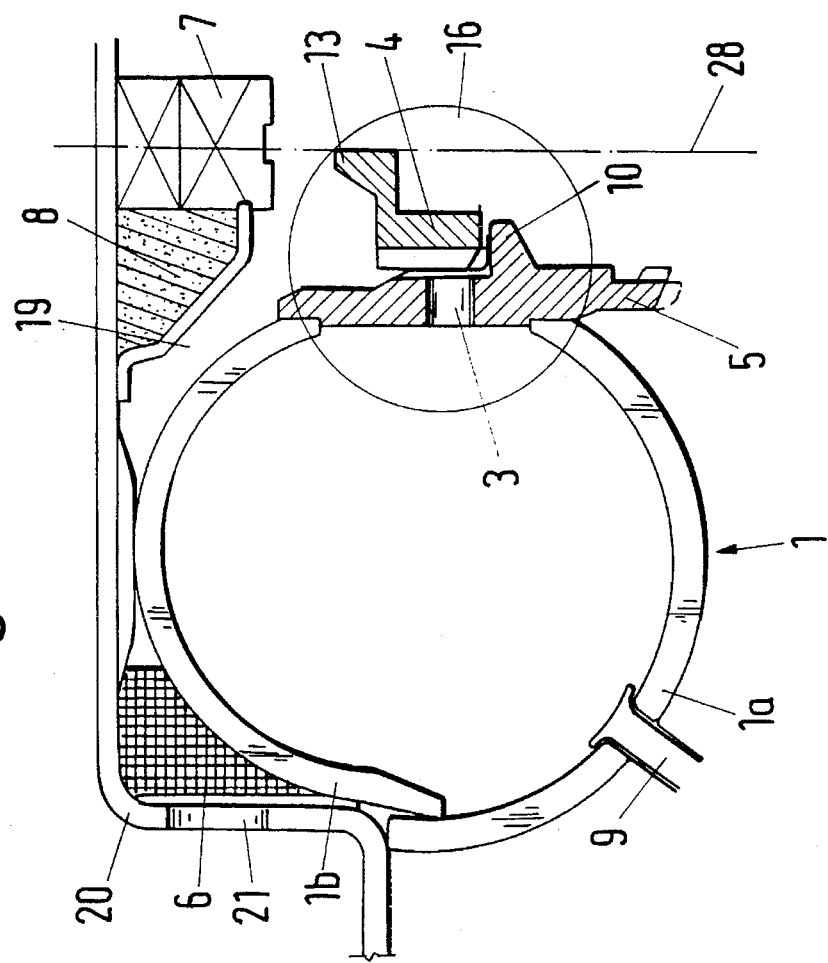

STORED GAS HYBRID DRIVER INFLATOR

BACKGROUND OF THE INVENTION

The present invention relates to a gas generator for an airbag, particularly in a motor vehicle, consisting of a pressure vessel for receiving a highly compressed gas under high pressure, with at least one opening in the pressure vessel which is closed by a seal and with a release mechanism.

In the current state of the art, essentially two different types of gas generator for airbags are known. The first type is of a purely pyrotechnical nature, that is to say a gas is available in chemically bonded form, preferably in the form of granules or powder pressed into tablets and is explosively released by ignition of a propellant. As propellants, substances are used which are based on sodium nitride ($NAN_3$) and an oxidation medium (for example, iron oxide), which, when combustion occurs, release the chemically bonded nitrogen, which is thereby available as gas and thereafter takes up a significantly greater volume. The chemically stored gas or oxidators used are therefore specifically mixed and processed together in such proportions and such compositions that the release of the gas finally takes place as a controlled combustion, that is to say certainly very rapidly, as an airbag must fill with gas within a fraction of a second, but on the other hand, this cannot be in the form of uncontrolled combustion, which could seriously damage the airbag and the other surroundings.

These pyrotechnical gas generators have the disadvantage that when ignited, significant quantities of solid fuel remnants are produced, which must be contained during the violent combustion process to avoid them coming into contact with the relatively thin walled and delicate material of the airbag, which they could otherwise perforate and thereby risk burning the occupants of the vehicle. This necessitates integration of suitable filters which results in proportionately high costs for the gas generator. Gas generators with alternative chemical substances and organically based compositions have the disadvantage that they are not always very stable and their properties change in time because of the effects of heat. As an airbag built into a motor vehicle may perhaps only be used after fifteen years, its functional capability can be significantly impaired by this. Furthermore, organic propellants produce large amounts of toxic gases, particularly carbon monoxide (CO).

Due to the aforementioned reasons, gas generators were developed in the past composed essentially of a pressure vessel which contains highly compressed gas and are provided with an opening with a seal. Furthermore, for such gas generators a release mechanism is provided, which, for example, penetrates or otherwise destroys a membrane which generally seals the exit opening of such a pressure vessel, so that the gas which is under high pressure can exit and fill the airbag. In conventional airbags for drivers or passengers in a motor vehicle, the volume of this type of high pressure vessel is usually between 200 and 400 $cm^3$, and the gas is compressed to a pressure typically between 200 and 300 bar in this pressure vessel, so that under normal pressure, or the slight high pressure in the finally filled airbag, this gas fills a volume of between about 50 and 150 liters. Naturally, deviations from these typical values are possible, according to usage.

In a gas generator which exclusively contains compressed gas in a pressure vessel, which is released when an accident occurs, the disadvantage arises that the expansion of the gas, which occurs in a fraction of a second and is thus practically adiabatic, drastically lowers the temperature thereof, so that at first, at normal pressure, it only occupies a comparatively small volume which would not be sufficient to satisfactorily fill the airbag if the pressure vessel were not designed to be correspondingly larger. The latter would involve problems with space. Furthermore, with such gas generators, there is the significant disadvantage that the gas development occurs degressively, whereas for optimal and timely filling of an airbag, a progressive gas development in the first phases is necessary instead.

For this reason, apart from the purely pyrotechnical gas generators, in practice so-called hybrid generators have proved themselves, which, besides a store for highly compressed gas also have a pyrotechnical charge which is however mainly for heating purposes and less for gas development, so that the adiabatically expanding gas is heated at the same time as it expands and thus sufficiently fills the volume of the airbag. Compared to a purely pyrotechnical gas generator, such a hybrid generator has the advantage that the pyrotechnical charge has to be exclusively for heating purposes and in that there is a larger choice of suitable pyrotechnical heating media. The amount of pyrotechnical charge can be kept significantly lower than in the case of a purely pyrotechnical gas generator, so that only a few solid fuel remnants are produced.

By selective layout and combination of the pyrotechnical heating charge with respect to the quantity as well as with respect to the combustion characteristic, an optimum filling procedure for the airbag can be achieved for the respective motor vehicle requirement.

Obviously, the use of such an airbag is not restricted to steering wheel bosses, nor indeed to motor vehicles, but could for example be installed in boats or ships or aircraft, and generally anywhere that a large volume of gas is rapidly required for a short time.

The state of the art closest to the present invention is a gas generator with a pressure vessel for highly compressed gas, in which the previously described hybrid solution is preferred but not absolutely necessary.

With known gas generators of this type, as already described, the gas is placed in a pressure vessel at a pressure of between 200 and 300 bar, typically at about 250 bar. This pressure vessel is then closed and an exit opening for emergencies is sealed by a membrane, wherein a release mechanism destroys the sealing membrane in case of an accident or other airbag release requirement and thus liberates the opening for the exit of the gas. As previously mentioned, a heating charge can also been ignited at the same time, which simultaneously heats the exiting gas. Clearly, a membrane of this type has to be very carefully designed, manufactured and installed in the pressure vessel. This is because on the one hand, this membrane has to tightly seal the pressure vessel against a pressure of approximately 250 bar for many years, and on the other hand it also has to give way to the release mechanism if an accident or other airbag release requirement occurs. The development and manufacture of such membranes is thus complex and expensive. The release mechanism also has to be designed in a correspondingly complex manner, so that it destroys the membrane with a preset minimum force and if possible also ignites the heating charge.

SUMMARY OF THE INVENTION

The object of the present invention, compared to this state of the art, is to create a gas generator for airbags with the features mentioned in the introduction, which has a simplified constructional assembly and is thus cheaper to produce and yet functions reliably.

This object is met in that the seal provided for the exit opening of the pressure vessel is sufficiently weak that it does not, or would not, withstand the nominal pressure of the gas filling in the pressure vessel, if it were provided by itself, so that an additional supporting element which is moveable by the release mechanism is provided, which supports the side of the seal opposite the exit opening of the pressure vessel. The seal can only withstand the pressure exerted from the interior of the pressure vessel with the aid of this additional supporting element. As soon as this support is discontinued, however, the seal is destroyed or torn off and thereby liberates the exit opening of the pressure vessel. To manufacture a suitable weak seal with a suitable strong support requires no large constructional and investment (planning) expenditure, but rather, suitable seals and supporting elements can easily be developed in a concrete manner with low experimental expenditure. In particular, the seal can have a very simple assembly and requires, for example, no specifically installed weak areas or rupture joints as was normal in membranes according to the state of the art. In this way, there is also a greater freedom for the shape number and arrangement of exit openings. In particular, the cross section of the exit for the gas exiting the pressure vessel can be significantly increased which contributes to even faster inflation of the airbag.

Separation of the sealing function from the load bearing function of the seal against the pressure prevailing in the pressure vessel also results in a significantly greater scope for choice of suitable materials, designs and shapes for the seal and the supporting element in comparison to the state of the art, in which the seal had to simultaneously fulfill both functions. In particular, this separation of the two functions presently described facilitates and simplifies the constructional assembly of the gas generator and ensures greater reliability of function.

In the preferred embodiment of the invention, the pressure vessel has, in addition to the exit opening for the gas which is under pressure, at least one filling opening which is separate from the exit opening and which facilitates the filling operation to the extent that the exit opening can first be sealed with the provided seal and the additional supporting element. A particularly preferred embodiment of the invention is one in which the pressure vessel has the shape of a torus, wherein this torus if possible should also have an approximately circular cross-section for hydrostatic reasons.

According to the invention, it is furthermore provided that the seal is arranged on the internal annular surface of the torus which defines the annular opening of the torus. Naturally, this facilitates the mounting of a supporting element as obviously the removable supporting element on the side opposite the seal also has to be supported, wherein such an oppositely positioned supporting surface on the interior of a ring or torus is automatically provided. Moreover it is also necessary for mounting the seal and also the supporting element when this internal annular surface of the torus is formed at least sectionally cylindrically walled or at least level. Naturally, seals on cylindrical surfaces or on level surface sections are much easier to mount than on actual torus surfaces of a torus, the body of which has a circular cross-section.

Moreover, an embodiment of the invention is preferred in which the torus which comprises the pressure vessel is itself composed of several parts and indeed preferably of at least two parts, one part of which is the annular element which forms the internal annular wall of the torus.

In the preferred embodiment, this annular element has a cylindrical wall defining the internal annular surface of the torus, which is limited in the axial direction by a flange which thereby serves as a contact shoulder for the seal as well as for the supporting element.

In the preferred embodiment of the invention, the seal is either a metallic sheet which, for example, is tightly fixed to a level surface or around an exit opening, for example an annular metal sheet strip, or, in the preferred embodiment of the invention, a cup-shaped membrane ring, which covers the entire annular surface of the torus provided with exit openings.

The torus normally consists of at least three parts, that is, besides the internal ring, of an upper and lower half ring with respect to a meridian plane, which are welded together on their external perimeter, whereas their internal ends are welded to the internal ring.

The supporting element preferably has a cylindrical external contour, wherein its diameter is adapted to the internal diameter of the internal ring of the torus, and if necessary also after deduction of the thickness of the seal.

In the preferred embodiment the supporting element either fits together with the seal or once the seal is already fixed onto the internal ring, with an interference fit into the internal annular opening of the torus, which is defined by a cylindrical wall.

The supporting element having a cylindrical external contour does not mean that it also has an exactly cylindrical external wall. Rather, the external wall in the preferred embodiment of the invention is provided with a plurality of grooves running in an axial direction, wherein, however, these grooves are kept so narrow or are so arranged when the supporting element is positioned, that either the seal, in the region of the grooves, withstands the internal pressure of the gas in the pressure vessel or the grooves are not arranged opposite the exit opening. These axial grooves have the purpose that on release of the supporting element removed axially with respect to the airbag, the gas which firstly flows out of the torus radially towards the interior and then flows away axially can escape more easily into the airbag without any noticeable impediment through the supporting element or where appropriate through its grooves provided in the external wall.

The seal is preferably composed of a thin metal plate, preferably of stainless steel with a wall thickness of a few tenths of a millimeter. Several exit openings are provided on the internal surface of the torus or the internal ring of the torus, substantially arranged on a circular plane. The seal is then preferably in the form of a membrane ring which is perforated at the front and is cup-shaped, which is fixed and sealed preferably by a welding procedure, in particular by laser welding, axially in front of and behind the exit opening in a ring shape to the internal ring of the torus. In this manner a large number of openings are easily simultaneously sealed with two geometrically very simple weld joints. The simple weld joint geometry is advantageous both from a production engineering point of view as well as the functional point of view, as weld joints of this type can be produced to be relatively regular, precise and thus also really tight.

Moreover, an embodiment of the invention is preferred in which the supporting element is at the same time configured as a type of impact bolt, whereby a pyrotechnical heating charge is arranged approximately on the axis of the torus, in front of the impact bolt, or in front of the supporting element and in particular in the direction of displacement thereof when removed from its position supporting the seal. If the release mechanism is then activated in the case of an accident of a motor vehicle, then the supporting element which is located on a narrow annular surface of the torus-shaped pressure vessel is penetrated in an axial direction by a further ignition capsule set up as an impact ignition or a propellant charge, thereby contacting the pyrotechnical heating charge and immediately igniting it, wherein simultaneously, because of the removal of the supporting element, the relatively thin and weak seal is no longer supported on its side opposite the pressure opening, and thus immediately gives way, tears open or tears away and allows the highly compressed gas to escape from the interior of the pressure vessel. Moreover, on the further path of the gas into the airbag, a filter or the like can conveniently be arranged, which retains any solid particles from the combustion of the heating charge or also broken pieces of the supporting element and/or the seal, so that they do not damage the thin-walled airbag.

The supporting element is preferably composed of a sintered metal, so that when suddenly charged, as, for example when released in the case of an accident, because of its relative bending brittleness should the case arise also breaks easily if it should, for any reason, not immediately slip out of its supporting position with respect to the seal. It is thereby to be noted that the supporting element has to be designed to be relatively stable as great forces are exerted inwardly in a radial direction on the supporting element through the seal because of the high pressure in the pressure vessel, which can however easily carry a supporting element of sintered metal by virtue of its high resistance to pressure. Conveniently, the torus-shaped pressure vessel can, together with the components according to the invention, be accommodated concentrically to a steering wheel axle inside the steering wheel boss.

Further advantages, features and possibilities for use of the present invention are clarified with the aid of the following description of a preferred embodiment and the accompanying drawings.

BRIEF DESCRIPTION OF THE DRAWINGS

FIG. 1a schematically shows the construction of a gas generator according to the invention, its pressure vessel, seal, supporting element and release mechanism FIG. 1b shows a construction similar to FIG. 1a, however, amended into a torus shape, FIG. 2 shows a section through a part of a gas generator of a preferred embodiment of the invention, FIG. 3 shows an enlarged section of the area of the seal in FIG. 2

DETAILED DESCRIPTION

Figure 4:
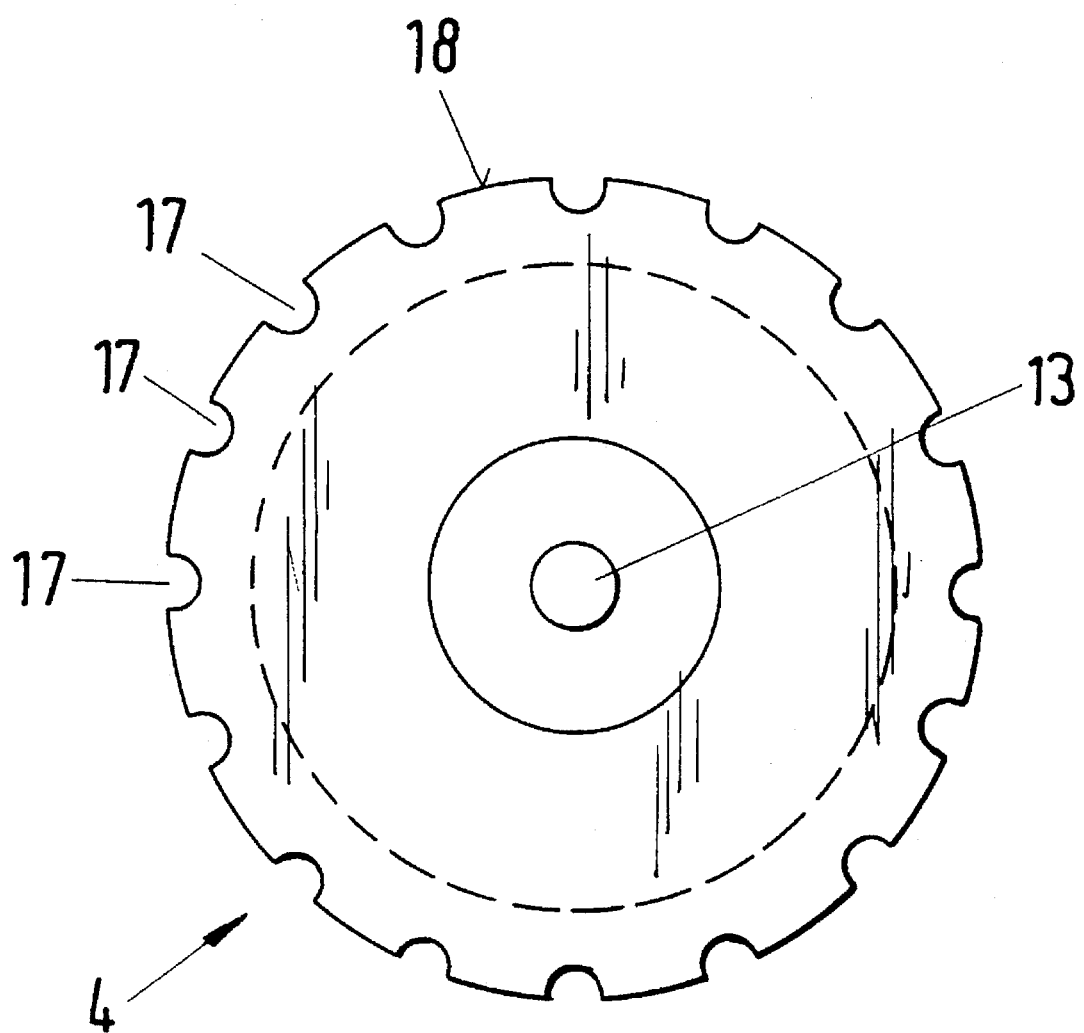
FIG. 4 shows an axial plan view of the supporting element according to the invention.

FIG. 1 is an outline sketch which simply makes clear the principal elements of the subject matter of the invention. As FIGS. 2 and 4 also show, the shapes of the pressure vessels, the supporting elements etc. vary substantially in the preferred embodiment of the invention from the components shown in FIG. 1.

FIG. 1a shows a pressure vessel 1 which is sectionally substantially formed as a rectangular box, with a filling opening 9 in its left wall and an exit opening 3 in its right wall. The exit opening 3 is sealed by a seal 2, for example in the form of a thin metal sheet. The opening 3 can be, for example, circular or rectangular in cross-section and the seal 2 is adapted to this shape and tightly fixed around the opening 3 on the edge of the opening or the external wall of the pressure vessel 1. The seal 2 is supported by a supporting element 4 on its side which is opposite to the opening 3, which can, for example, be a solid block of sintered metal. (This supporting element 4 is itself retained by a clip 15 which is connected in a fixed manner to the container 1). If the seal 2 is composed of a metal sheet, it can, for example, be welded around the opening 3 onto the wall of the container 1.

A propellant charge 16 which forms a release mechanism or is connected to one is arranged on a surface of the supporting element 4 which is substantially at right angles to the plane of the seal 2. By release or ignition of the propellant charge 16, the supporting element 4 is propelled downwards. With this, the support of the seal 2, which previously was available over the major part of its surface, is gone. Whereas previously with the presence of the supporting element 4, the major part of the force of pressure of the compressed gas in the pressure vessel 1 was transferred via the seal 2 directly to the supporting element 4, and the weld joint 14 around the opening 3 had only to take comparatively low force of pressure because of its very small total area, the seal 2 and its weld joint 14 must now take the entire force of pressure which results from the product of the pressure prevailing in the pressure vessel 1 and the whole surface of the seal 2. If the seal 2 is, for example, of stainless steel of a thickness of, for example 0.2 mm, and if moreover the total area of the exit opening amounts to approximately 1 cm$^2$, a seal 2 of this type, and the weld joint 14 thereof for fixing onto the wall of the container 1 are too weak to contain the total force of approximately 250 kp (2500 N), which the compressed gas approximately produces. With a pipe or cup-shaped seal 2, with a peripheral weld joint on the side of the opening or openings 3, the proportion of the total force of the gas pressure to the length of the weld joints 14 further increases. The seal 2 or the weld joints thereof would therefore tear apart and liberate the gas. Naturally, according to the size of the exit opening and to the solidity of the material of the seal and the weld joints, the strength of the wall of the seal can be adapted in a suitable manner so that the seal 2 or the weld joints 14 thereof tear in any case when the full pressure, in the order of between 200 and 300 bar affects the total area of the seal, whereas on the other hand, when the major part of the area of the seal is supported, the remaining residual force affecting the seal is easily contained by this or these weld joints.

Whereas essentially the cross-section of the pressure vessel 1, as well as the extension thereof perpendicularly to the plane of the drawing can be as desired, a useful expansion of this cross-sectional shape into a torus is nevertheless shown in dashed lines in FIG. 1a, and indeed with a rectangular torus cross-section. (As can easily be imagined from FIGS. 1a, b, the clip 15 can then easily be dispensed with and the supporting element is simply widened in a radial direction so that it supported itself on the opposite internal surface of the body of the torus). The cuboid-shaped variation with a retainer 15 is shown in FIG. 1a with a broken line. The torus variation in shown again in FIG. 1b. While in FIG. 1a the pressure vessel can easily be a more or less cuboid-shaped box, on one side of which a clip is arranged to retain the supporting element for the seal, this clip can be dispensed with in the case of expansion into a torus according to FIG. 1b, wherein this variation is already shown in FIG. 1a by a dashed line. Of course, a further exit opening 3 can then also be provided opposite the exit opening 3, or as many exit openings as desired can be distributed around the internal periphery of the torus, which, in the preferred embodiment of the invention is covered by an annular sealing band 2. An embodiment provided with this type of feature is shown in FIGS. 2 and 3, which each show a cross-section through a part of the toroidal pressure vessel.

The difference between the embodiment in FIG. 2 compared to the amended embodiment according to FIG. 1b, shown in dashed lines, is firstly in the cross-section of the torus-shaped pressure vessel, which in FIG. 2 is approximately circular, as the pressure vessel thus shaped has a higher pressurization capacity, and a favorable volume to area ratio. Moreover, the pressure vessel 1 in the embodiment according to FIG. 2 is manufactured substantially in three parts, that is a lower half-ring 1a and an upper half-ring 1b which are connected to each other along a continuous external weld joint 14 as well as an internal ring 5 which defines the internal annular opening of the torus, which is welded to the internal edges of the two half-rings. Apart from a convenient adaptation to the external surfaces and edges of the ring 5, in particular in the region of transition to the half-rings on the pressure vessel, the ring 5 is provided in particular with an internal cylinder wall surface 5a as well as a flange 10. The flange 10 forms a shoulder surface 11 which delimits on one side, in axial direction, the cylinder wall surface. In the cylinder wall surface several openings 3 are distributed over the periphery of the ring, for example in the form of bored holes. Certainly, a single opening 3 would be sufficient, preferably however four or more openings, for example, are distributed around the periphery of the ring. The seal 2 is a continuous ring-shaped metal band which is, however, lightly profiled, and, as shown in FIG. 3, is provided with an approximately L-shaped cross-section. For accurate and yet inexpensive production of the sealing function, which concerns the seal 2 as an individual part as well as the fitting of the ring 5 or the supporting element 4 and the welding thereof, an embodiment of the seal 2 as a deeply cupped metal pot with a stamped circular base section is preferred. One leg of the seal rests on the shoulder surface 11 of the flange 10, while the other leg extends parallel to the cylinder wall 5a of the ring 5 and thereby also covers all the openings 3. Above the circle of openings 3, the seal 2 is welded to the cylindrical internal wall 5a of the ring 5, and below the circle of openings, the second leg of the seal 2 is welded to the shoulder surface 11 of the flange 10, preferably by laser welding, as even very thin sheets can be welded with absolutely tight welds to corresponding opposite surfaces with the aid of an automatically controlled laser beam.

On the other hand, the leg of the seal 2 which has an I-shaped or otherwise circular cross-section, resting on the flange 10 is welded to the flange 10. A supporting element 4 with a cylindrically shaped external contour is inserted into the internal ring of the torus, wherein the external diameter of the supporting element 4 is slightly smaller than the internal diameter of the cylindrical wall 5a of the ring 5. After welding of the seal 2, the supporting element 4 is pushed into the latter as far as the shoulder on the flange 10 and remains sufficiently tightly held there by means of interference fit onto the seal 2 to ensure it against accidental working loose because of impact or vibration.

As shown in FIG. 4, the more or less cylindrical external wall of the supporting element 4 is moreover provided with grooves 17 running in an axial direction, only one of which is shown in cross-section in FIGS. 2 and 3. Whereas in the rest of the areas, the seal 2 is firmly pressed against the cylindrical external wall 18 of the supporting element 4, as shown in FIG. 3, in the cylindrical edge area, the seal becomes slightly wider towards the direction of the ring 5, so that the weld joint 14 does not impede the axial movement of the supporting element 4 with deposits. The grooves 17 are dimensioned to be narrow enough that the seal can easily withstand the resultant forces and neither tears nor gives way.

In FIG. 2 half of the supporting element 4, that is to say up to the axis of the gas generator 28, is shown. Naturally, with a complete cross-sectional representation the other side, to the right of the axis 28 would be a mirror image. It is recognized therefore that the supporting element 4 is a hollow cylindrical part, one end face of which is sealed and which is provided with a point 13 which acts as an impact bolt. A propellant charge 16 is located in the hollow space formed by the supporting element 4 and is activated in the case of an accident by acceleration-dependent sensor technology, for example, by electric current, which is located in the motor vehicle. In this way the supporting element 4 is penetrated in an axial direction by a impact igniter 7 with subsequent pyrotechnical heating charge 8, which is hereby also ignited and heats the gas exiting the pressure vessel 1 through the openings 3, which cools down due to the sudden drop in pressure and expansion, the gas can escape from the pressure vessel 1 through the openings 3 after the supporting element 4 is penetrated by the impact igniter 7 and the pyrotechnical heating charge 8, as thereafter the internal pressure in the vessel affecting the whole surface of the seal 2 through the openings 3 tears open the seal or the weld joints thereof to the ring 5. As, due to considerations of space, the supporting element cannot move very far away from the ring 5 in an axial direction, the axial grooves 17 have the advantage that the gas now coming from the pressure vessel 1, through the openings 3, in FIG. 3 upwards past the supporting element 4 and through the channel 19 over the filter 6 and the outflow openings 21 of the gas generator, enters the connected folded up airbag. A filter is designated 6, and has to retain any combustion remnants from the pyrotechnical heating charge 8.

The preferred embodiment of the present invention is thus a gas generator of the hybrid type the assembly of which is simple and inexpensive to manufacture. Naturally, the function of the invention is completely independent upon the existence of a pyrotechnical heating charge, and that obviously, the supporting element 4 is not removed from the seal 2 by a pyrotechnical propellant charge, but with a pre-stressed strong spring or the like. Furthermore, clearly, the torus shape of the pressure vessel is not at all absolutely necessary for the function of the invention, as FIG. 1 (without the amendment shown in dashed lines) and the corresponding explanation thereof have shown.

Moreover, it is also not necessary that the seal 2 is welded onto the ring 5 or corresponding surfaces of a pressure vessel, and it is also unnecessary for the seal 2 to be composed of a metal. For example, thus, the outer edges of the opening 3 can be provided with an enlargement or shoulder-shaped recess, in which a deformable seal is inserted by interference fit. The interplay of the internal pressure of the gas with the externally counteracting pressure of the supporting element then presses such an additional elastic seal into such a recess and against the sheet-shaped seal, so that also hereby, a reliable seal can be achieved, even if manufacture is possibly rather more complex.

I claim:

1. A gas generator for an airbag, the gas generator comprising a pressure container (1) for receiving a high pressure, highly compressed gas, with at least one exit opening (3) in the pressure container (1) closed by a seal (2) with a release mechanism, whereby the gas exerts pressure against the seal and wherein the seal (2) is constructed to be so weak that the seal cannot, by itself, withstand the nominal pressure of the gas contained within the pressure container (1), the gas generator additionally comprising a supporting element (4) which is displaceable by means of the release mechanism in a direction perpendicular to the pressure exerted by the gas against the seal, the supporting element supporting the seal on the side of the seal (2) opposite the exit opening (3).

2. The gas generator according to claim 1, characterized in that the pressure container (1) has at least one filling opening (9).

3. The gas generator according to claim 1 characterized in that the pressure container (1) is in the shape of a torus having an approximately circular cross-section.

4. The gas generator according to claim 3 wherein the torus-shaped pressure container includes an internal annular surface which defines an annular opening, characterized in that the seal (2) is arranged on the internal annular surface of the torus-shaped pressure container.

5. The gas generator according to claim 4, characterized in that the internal annular surface of the torus-shaped pressure container is formed at least sectionally in the shape of a cylindrical wall.

6. The gas generator according to claim 3, characterized in that several exit openings (3) are provided along the inside of the torus-shaped pressure container (1).

7. The gas generator according to claim 1, characterized in that the seal comprises a thin metal sheet.

8. The gas generator according to claim 7, characterized in that the seal is a ring comprising stainless steel.

9. The gas generator according to claim 8, wherein the pressure container (1) is in the shape of a torus having an internal annular surface including the at least one exit opening and wherein the seal is welded to the pressure container, covering the at least one exit opening (3).

10. The gas generator according to claim 4, characterized in that the supporting element (4) has an approximately cylindrical external contour and is provided radially, within the annular opening, substantially filling the annular opening.

11. The gas generator of claim 10 wherein the supporting element includes at least one axially extending gas flow groove in the approximately cylindrical external contour of the supporting element.

12. The gas generator according to claim 4, characterized in that the internal annular surface of the torus-shaped pressure container is formed flat.

13. The gas generator according to claim 3, wherein the supporting element is formed as an impact bolt having a pyrotechnical heating charge arranged in front of the impact bolt, approximately on the axis of the torus-shaped pressure container.

14. The gas generator according to claim 13, characterized in that the supporting element is a hollow cylindrical body, with one sealed end face, with an impact point on the exterior of the end face.

15. The gas generator according to claim 1, characterized in that prior to release of gas from the pressure container the seal comprises a cup-shaped metal sheet.

16. The gas generator according to claim 1, characterized in that the supporting element (4) comprises a sintered metal.

17. A gas generator for an airbag, the gas generator comprising a pressure container for receiving a high pressure, highly compressed gas, the pressure container being in the shape of a torus having an approximately circular cross-section, with at least one exit opening in the pressure container closed by a seal with a release mechanism, wherein the seal is constructed to be so weak that the seal cannot, by itself, withstand the nominal pressure of the gas contained within the pressure container, the gas generator additionally comprising a supporting element which is displaceable by means of the release mechanism, the supporting element supporting the seal on the side of the seal opposite the exit opening, characterized in that the torus-shaped pressure container comprises at least two parts, one of which is an internal ring (5) defining an annular opening of the torus-shaped pressure container with a cylindrical internal wall at the exit opening and a flange (10) which axially delimits the cylindrical internal wall and protrudes radially inward, one surface of which forms a contact shoulder (11) for at least one of the supporting element (4) and seal (2).

18. A gas generator for an airbag, the gas generator comprising a pressure container for receiving a high pressure, highly compressed gas, the pressure container being in the shape of a torus having an approximately circular cross-section with at least one exit opening in the pressure container closed by a seal with a release mechanism, wherein the seal is constructed to be so weak that the seal cannot, by itself, withstand the nominal pressure of the gas contained within the pressure container, the gas generator additionally comprising a supporting element which is displaceable by means of the release mechanism, the supporting element supporting the seal on the side of the seal opposite the exit opening, and formed as an impact bolt having a pyrotechnical heating charge arranged in front of the impact bolt, approximately on the axis of the torus-shaped pressure container, characterized in that the release mechanism for displacement of the supporting element (4) is provided with a pyrotechnical charge with an ignition mechanism.

19. A gas generator for an airbag, the gas generator comprising a pressure container for receiving a high pressure, highly compressed gas, the pressure container being in the shape of a torus having an approximately circular cross-section and including an internal annular surface formed at least sectionally in the shape of a cylindrical wall and defining an annular opening in the torus-shaped pressure container, with at least one exit opening in the pressure container closed by a seal with a release mechanism, wherein the seal is constructed to be so weak that the seal cannot, by itself, withstand the nominal pressure of the gas contained within the pressure container, the gas generator additionally comprising supporting element which is displaceable by means of the release mechanism, the supporting element supporting the seal on the side of the seal opposite the exit opening, the gas generator having a flange (10) protruding radially inward on the internal surface which defines the annular opening of the torus-shaped pressure container, the flange (10) forming a shoulder providing an axial supporting surface for the supporting element.

* * * * *